United States Patent
Davis (10) Patent No.: US 8,489,421 B2
(45) Date of Patent: Jul. 16, 2013

(54) HEALTH CARE COST MANAGEMENT MARKETPLACE

(76) Inventor: Matthew Davis, Mesa, AZ (US)

( * ) Notice: Subject to any disclaimer, the term of this patent is extended or adjusted under 35 U.S.C. 154(b) by 103 days.

(21) Appl. No.: 13/208,021

(22) Filed: Aug. 11, 2011

(65) Prior Publication Data

US 2012/0284038 A1    Nov. 8, 2012

Related U.S. Application Data

(60) Provisional application No. 61/481,663, filed on May 2, 2011.

(51) Int. Cl.
*G06Q 50/00* (2012.01)

(52) U.S. Cl.
USPC ............. 705/2; 705/3; 705/4; 705/37

(58) Field of Classification Search
USPC ................................. 705/2–4, 37
See application file for complete search history.

(56) References Cited

U.S. PATENT DOCUMENTS

| | | | |
|---|---|---|---|
| 6,453,297 B1 | 9/2002 | Burks et al. | |
| 7,657,479 B2 | 2/2010 | Henley | |
| 7,765,146 B2 | 7/2010 | Sakaue et al. | |
| 8,135,599 B2* | 3/2012 | Simpson et al. | 705/4 |
| 2002/0065758 A1* | 5/2002 | Henley | 705/37 |
| 2003/0225669 A1 | 12/2003 | Cohen | |
| 2005/0182660 A1* | 8/2005 | Henley | 705/2 |
| 2007/0288262 A1* | 12/2007 | Sakaue et al. | 705/2 |
| 2008/0228626 A1 | 9/2008 | Frankenberg | |
| 2010/0094651 A1 | 4/2010 | Rouben | |
| 2010/0094662 A1 | 4/2010 | Henley | |
| 2010/0223148 A1 | 9/2010 | Payton | |
| 2011/0022479 A1 | 1/2011 | Henley | |
| 2011/0264467 A1* | 10/2011 | Green et al. | 705/3 |

OTHER PUBLICATIONS

Medical cost advocate, www.MedicalCostAdvocate.com, Feb. 1, 2009, p. 1-7.*
Arbietman et al., "E-Commerce for Healthcare Supply Procurement," Journal of Healthcare Information Management, vol. 15, No. 1, Spring 2001, pp. 61-72.
Smits et al., "Using Electronic Auctions to Improve Market Performance in Health Care," 20th Bled eCommerce eMergence: Merging and Emerging Technologies, Processes, and Institutions, pp. 143-154, Jun. 4-6, 2007; Bled, Slovenia.
Herrick, Devon, "Why are Health Costs Rising?", Brief Analysis, No. 437, National Center for Policy Analysis, May 7, 2003.

* cited by examiner

*Primary Examiner* — Sind Phongsvirajati
(74) *Attorney, Agent, or Firm* — Morgan Law Offices, PLC (57) ABSTRACT

A health care cost management marketplace brings together health care payers and health care cost management vendors. The health care cost management vendors bid on lots of single-claims or multiple claims. Health care cost reduction contracts are awarded to vendors whose bids project the greatest net health care cost reduction savings. Auctions are timed and vendors may change their bids while time remains. Bids include a vendor fee percentage, and, for single claim lots, may further include an estimated cost savings amount. For the single-claim lots, vendors which fail to achieve actual cost reduction savings above a predetermined threshold compared to estimated savings can be penalized.

16 Claims, 8 Drawing Sheets

Current Auctions - Placing a Fee for Service Bid

Green Light
COST MANAGEMENT

Green Light Cost Management - Vendor Portal

Header

- Home
- Account
- Auctions
  - Summary
  - Upcoming Auctions
  - Current Auctions
  - Completed Auctions
  - Closed Auctions
- FTP Site
- Reports
- Contact GreenLight
- Logout

Lot 110415-0008

| | | |
|---|---|---|
| Claim Count | 50 | Provider Tax ID |
| Billed Charges | $83,268.12 | Provider Name |
| Excluded Charges | $0.00 | |

Current Fee for Service
8% of Savings

Fee for Service
[7%▼] of Savings

| View Claims | Hide Bid |
|---|---|
| # Bids | 9 |
| Lowest Bid | 8% of Savings |
| Your Bid Fee | 8% of Savings |

[Update Bid]

Lot 110415-0008

| | | |
|---|---|---|
| Claim Count | 13 | Provider Tax ID |
| Billed Charges | $12,603.68 | Provider Name |
| Excluded Charges | $0.00 | |

Current Fee for Service
8% of Savings

Fee for Service
[5%▼] of Savings

| View Claims | Hide Bid |
|---|---|
| # Bids | 5 |
| Lowest Bid | 8% of Savings |
| Your Bid Fee | 10% of Savings |

[Update Bid]

Lot 110415-0009

| | | |
|---|---|---|
| Claim Count | 1 | Provider Tax ID |
| Billed Charges | $140,206.20 | Provider Name |
| Excluded Charges | $0.00 | |

| View Claims | Update Bid |
|---|---|
| # Bids | 16 |
| Lowest Bid | 8% of Savings |
| Your Bid Fee | 9% of Savings |

© 2011 GreenLight Management

FIG. 6

Closed Auctions

File Edit View History Bookmarks Tools Help

☐ Closed Auctions

Green Light
COST MANAGEMENT

| Home |
|------|
| Account |
| Auctions |
| Summary |
| Unbatched Claims |
| Upcoming Auctions |
| Current Auctions |
| Completed Auctions |
| Closed Auctions |
| Archive |
| Reports |
| Logout |

Closed Auctions
Close All Completed Auctions

| Lot 110406-0003 | | Provider Tax ID | | View Claims | Show Bids |
|---|---|---|---|---|---|
| Claim Count | 50 | Provider Name | | # Bids | 9 |
| Billed Charges | $8,115.03 | | | Lowest Bid | 16% of Savings |
| Excluded Charges | $0.00 | | | Winner ID | FV1 |

| Lot 110406-0004 | | Provider Tax ID | | View Claims | Show Bids |
|---|---|---|---|---|---|
| Claim Count | 1 | Provider Name | | # Bids | 22 |
| Billed Charges | $46,000.00 | | | Lowest Bid | 6% of Savings |
| Excluded Charges | $0.00 | | | Winner ID | DCT1 |

| Lot 110406-0007 | | Provider Tax ID | | View Claims | Show Bids |
|---|---|---|---|---|---|
| Claim Count | 13 | Provider Name | See Claims | # Bids | 14 |
| Billed Charges | $9,206.14 | | for Details | Lowest Bid | 11% |
| Excluded Charges | $0.00 | | | Winner ID | FV1 |

© 2011 GreenLight Management
Done                                                06:25:01

Closed Auctions - Bid History — Mozilla Firefox

File Edit View History Bookmarks Tools Help

Closed Auctions

Green Light COST MANAGEMENT

- Home
- Account
- Auctions
  - Summary
  - Unbatched Claims
  - Upcoming Auctions
  - Current Auctions
  - Completed Auctions
  - Closed Auctions
  - Archive
- Reports
- Logout

Closed Auctions
Close All Completed Auctions

Lot 110406-0003

| Claim Count | 50 | Provider Tax ID | |
| Billed Charges | $8,115.03 | Provider Name | |
| Excluded Charges | $0.00 | | |

| Vendor ID | Bid Time | Bid Fee | Bid Discount | Calculated Bid Amount |
|---|---|---|---|---|
| FV1 | 09:48:00 | 16 | 0 | 0 |
| dct | 17:57:00 | 19 | 0 | 0 |
| dct | 17:57:00 | 23 | 0 | 0 |
| dct | 16:48:00 | 24 | 0 | 0 |
| FV1 | 09:23:00 | 24 | 0 | 0 |
| FV1 | 09:37:00 | 24 | 0 | 0 |
| FV1 | 09:37:00 | 24 | 0 | 0 |
| FV1 | 09:44:00 | 24 | 0 | 0 |
| FV1 | 09:00:00 | 27 | 0 | 0 |

View Claims | Hide Bids

| # Bids | 9 |
| Lowest Bid | 16% of Savings |
| Winner ID | FV1 |

© 2011 GreenLight Management

Done  06:26:28

HEALTH CARE COST MANAGEMENT MARKETPLACE

CROSS REFERENCE TO RELATED APPLICATIONS

The present application is related to and claims priority from prior provisional application Ser. No. 61/481,663 filed by Matthew Davis on May 2, 2011 and entitled "Health Care Cost Management Marketplace", the contents which are incorporated herein by reference.

FIELD OF THE INVENTION

The present invention relates to the field of health care cost management, and, more particularly, to an electronic marketplace wherein health care payers contract for cost reduction services with certified health care cost management vendors.

BACKGROUND

Insurers and self-insurers have several tools to manage the costs associated with the health care needs of their members. Most commonly, health care plans lease access to a preferred provider organization (PPO), which is a health care organization that owns contracts for discounts with physicians, hospitals, and other medical providers which provide health care services for a reduced fee to eligible health plan members.

The following features are typically present in many PPO subscription agreements and must be met for members to be eligible for the contractual discounts:

Steerage—a mechanism which encourages members to seek medical treatment from participating medical providers. Steerage is typically influenced by medical providers by a specific PPO logo printed on the member's insurance card.

Financial Incentive/Benefit Differential—incentives in place to encourage members to seek medical treatment from medical providers participating in the PPO. Typically these incentives are found in the form of benefit differentials between In-Network and Out-of-Network benefits. For example, if a member is treated by an In-Network medical provider, their claims may be considered and paid at a benefit level of 80/20. The "80" is the percentage of the allowed charges that the health plan will pay and the "20" is the percentage of the allowed charges that the patient will be responsible for. If a member is treated by an Out-of-Network medical provider, their claims may be considered and paid at a benefit level of 60/40. The "60" is the percentage of the allowed charges that the health plan will pay and the "40" is the percentage of the allowed charges that the patient will be responsible for.

Payment Timeframe—Typically, PPO agreements call for claims to be processed and paid within 30 days from health plan receipt.

Health plan members typically have the freedom to choose to receive health care treatment from medical providers participating in the PPO (In-Network) or by providers not participating in the PPO (Out-of-Network).

When health plan members make the decision to seek treatment from an Out-of-Network provider, health plans are billed at rates which are often set artificially high. With no contractual discount agreement present, health plans often pay substantially more for the health care of their members and also shift responsibility for the portion of charges not covered by the health plan to the member. This practice, along with higher participation in the cost of out of network care, penalizes the member financially for going to an Out-of-Network provider. Members are responsible to participate in the expense of Out-of-Network health care at higher co-insurance levels, as well as any portion not covered by the health plan, e.g., usual, customary, and reasonable (UCR) reductions. The following example illustrates these financial penalties to the health plan member.

Member A has a routine tonsillectomy performed. This example assumes that the patient is an adult seeking treatment in New York City, and there are no complications during the procedure.

In-Network Example

| | |
|---|---:|
| Billed Charge | $7,000.00 |
| UCR Reduction | 0.00 |
| PPO Contracted Rate | 1,542.00 |
| Savings | 5,458.00 |
| Patient Deductible | 100.00 |
| Patient Co-Insurance (20%) | 288.40 |
| Health Plan Payment (80%) | 1,153.60 |
| Total Due from Patient | 388.40 |

Out-of-Network Example

| | |
|---|---:|
| Billed Charge | $7,000.00 |
| UCR Reduction | 3,800.00 |
| Allowed Amount | 3,200.00 |
| Savings | 0.00 |
| Patient Deductible | 100.00 |
| Patient Co-Insurance (40%) | 1,240.00 |
| Health Plan Payment (60%) | 1,860.00 |
| Total Due from Patient | 5,140.00 |

Regardless of penalty, patients often elect to receive treatment from an Out-of-Network provider. Health plans have aggressively pursued cost management solutions that reduce billed charges and shelter members from balance billing as illustrated in the above example.

SUMMARY OF THE INVENTION

A health care cost management marketplace brings together health care payers and health care cost management vendors. The health care cost management vendors bid on lots of single-claims or multiple claims. Health care cost reduction contracts are awarded to vendors whose bids project the greatest net health care cost reduction savings. Auctions are timed and vendors may change their bids while time remains. Bids include a vendor fee percentage, and, for single claim lots, may further include an estimated cost savings amount. For the single-claim lots, vendors which fail to achieve actual cost reduction savings above a predetermined threshold compared to estimated savings can be penalized.

One aspect of the disclosure relates to a method for providing a health care cost management marketplace to reduce health care costs. In one embodiment, the method includes the steps of (1) receiving requests to perform health care cost reduction services, each of the requests referring to at least one claim for at least one health care service previously rendered, (2) creating claim lots, wherein, depending on application of a predetermined rule, some of the received claims are placed into single-claim lots and others are bundled together into multiple-claim lots, (3) posting the created claim lots in a visible format, (4) responsive to the posting, receiving bids for performing health care cost reduction services for at least one of the posted claim lots, from cost reduction management vendors; and (5) awarding cost reduction contracts to perform health care cost reduction services to cost reduction management vendors whose bids project the greatest net health care cost reduction savings.

Preferably, each of the requests to perform health care cost reduction services is received from a health care payer. In general, a health care payer will be any group/entity which underwrites the risk of a health plan or underwrites or assumes the risk of a health benefit plan; or administrates or pays claims on behalf of any group/entity which underwrites the risk of a health plan or underwrites or assumes the risk of a health benefit plan (e.g., a health insurance company, Third-Party administrator, self-funded employer or self-funded employer group, union, or pharmacy benefit manager). Preferably, each of the bids for performing health care cost reduction services is received from a certified cost reduction management vendor (e.g., a reliable, capable and ethical cost reduction management vendor pre-approved to place bids).

Preferably, only bids received for a particular claim lot within a predetermined time period are considered. However, bids received for a particular claim lot may be changed if received within the predetermined time period.

Preferably, the predetermined rule for creating claim lots includes creating a single-claim lot if the claim amount exceeds a predetermined threshold amount (e.g., $2,500). Preferably, the predetermined rule for creating claim lots includes creating a multiple-claim lot by bundling claims for a same health care provider. Preferably, the predetermined rule for creating claim lots includes creating a multiple-claim lot by bundling claims for a same patient. Preferably, the predetermined rule for creating claim lots includes creating a multiple-claim lot by bundling claims each of which claim is less than a predetermined threshold amount. It is to be appreciated that the predetermined rules for creating claim lots can be modified from time to time, and the examples provided herein are meant for illustrative purposes.

Preferably, for single-claim lots, bids for performing health care cost reduction services include an amount of projected savings and a fee for the cost reduction services. Preferably, for multiple-claim lots, bids for performing health care cost reduction services include only a fee for the cost reduction services. Preferably, the fee is a percentage of the actual claim amount reduction.

Preferably, the method further includes the step of penalizing an awarded health care cost reduction management vendor, if the actual claim amount reduction is less than the projected claim amount reduction by more than a predetermined amount or predetermined percentage. Preferably, the penalty amount is proportionate to the percentage that the actual claim reduction amount is different from the projected claim reduction amount. Preferably, the penalty logic will only be applied to vendors awarded single-lot contracts.

These and other aspects, features, and advantages of the present invention will become apparent from the following detailed description of preferred embodiments, which is to be read in connection with the accompanying drawings.

DETAILED DESCRIPTION

Figure 1:
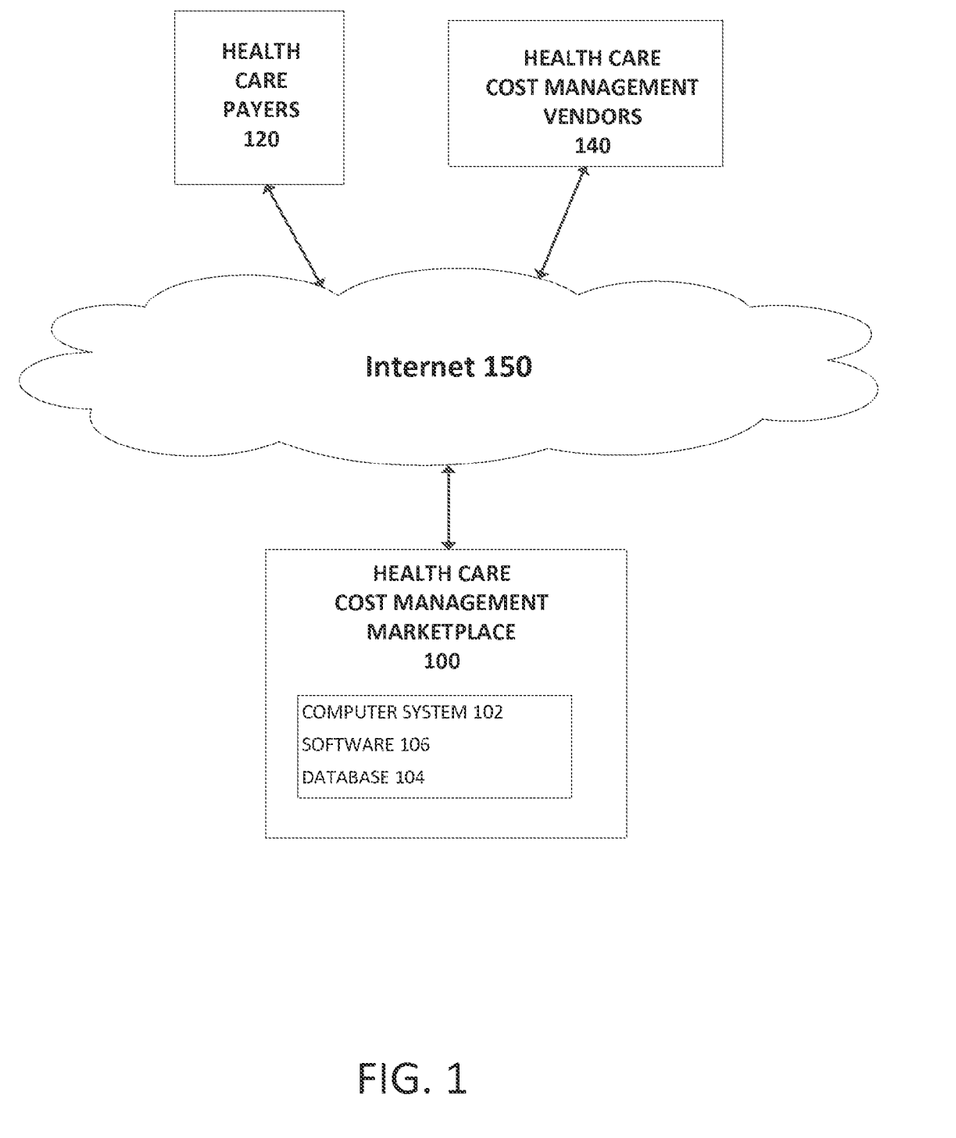
FIG. 1 shows an exemplary block diagram of a health care cost management marketplace connecting health care payers and health care cost management vendors.

FIG. 1 illustrates an exemplary diagram of a health care cost management marketplace 100 connecting health care payers 120 and health care cost management vendors 140. As depicted, the health care cost management marketplace 100, the health care payers 120, and the health care cost management vendors 140 are linked via Internet 150. The Internet 150 provides a path for data communication, and allows exchange of information signals between the illustrated entities.

In general, the health care payers 120 will include any group/entity which underwrites the risk of a health plan or underwrites or assumes the risk of a health benefit plan; or administrates or pays claims on behalf of any group/entity which underwrites the risk of a health plan or underwrites or assumes the risk of a health benefit plan (e.g., a health insurance company, Third-Party administrator, self-funded employer or self-funded employer group, union, or pharmacy benefit manager). Preferably, the health care cost management vendors 140 will be pre-approved to place bids. Because the participants in the health care cost management marketplace 100 will each be invited to participate, it is to be understood that the health care cost management marketplace 100 is a "closed" marketplace. This ensures that market participants are capable, trustworthy, and reliable; it also allows participants not meeting requirements to be excluded.

As will be described in greater detail, the health care cost management marketplace 100 allows the health care cost management vendors 140 to bid on lots of single-claims or multiple claims. In the case of single-claim lots, cost reduction contracts are awarded to the health care cost management vendors 140 whose bids project the greatest net health care cost reduction savings. In the case of multiple-claim lots, cost reduction contracts are awarded to the health care cost management vendors 140 whose bids have the lowest entered fee percentage or amount. Auctions are timed and health care cost management vendors 140 may change their bids while time remains. Bids include the vendor fee percentage, and, for single claim lots, may further include an estimated cost savings amount. For the single-claim lots, health care cost management vendors 140 which fail to achieve actual cost reduction savings above a predetermined threshold compared to estimate savings can be penalized.

As illustrated, the health care cost management marketplace 100 includes a computer system 102, software 106, and a database 104. The computer system 102 includes a central processor, memory (RAM, ROM, etc.), fixed and removable code storage devices (hard drive, floppy drive, CD, DVD, memory stick, etc.), input/output devices (keyboards, display monitors, pointing devices, printers, etc.), and communication devices (Ethernet cards, WiFi cards, modems, etc.). Typical requirements for the computer system 102 include at least one server with at least an INTEL PENTIUM III processor; at least 1 GB RAM; 50 MB available disc space; and a suitable operating system installed, such as LINUX, or WINDOWS 2000, XP, 7, or Vista by Microsoft Corporation. Representative hardware that may be used in conjunction with the software of the present invention includes the POWER EDGE line of servers by Dell, Inc. and the SYSTEM X enterprise servers by IBM, Inc. The software 106 to accomplish the methods described below may be stored on a computer-readable medium and may also be transmitted as an information signal, such as for download. The database 104 can include any computer data storage system, but, preferably, is a relational database organized into logically-related records. Preferably, the database 104 includes a Database Management System (DBMS) useful for management of the data stored within the database 104. Representative DBMS that may be used by the present invention include Oracle Database by Oracle Corp., DB2 by IBM, and the SQL Server by Microsoft. The database 104 can either be a centralized or a distributed database.

Although not illustrated, the health care payers 120 and the health care cost management vendors 140 have computers with central processors, memory (RAM, ROM, etc.), fixed and removable code storage devices (hard drive, floppy drive, CD, DVD, memory stick, etc.), input/output devices (keyboards, display monitors, pointing devices, printers, etc.), and communication devices (Ethernet cards, WiFi cards, modems, etc.).

Although the Internet 150 is depicted as being used for communication among the illustrated entities, it is to be understood that other network elements could, alternatively, or in addition, be used. These include any combination of wide area networks, local area networks, public switched telephone networks, wireless or wired networks, intranets, the Internet or any other distributed processing network or system.

Figure 2:
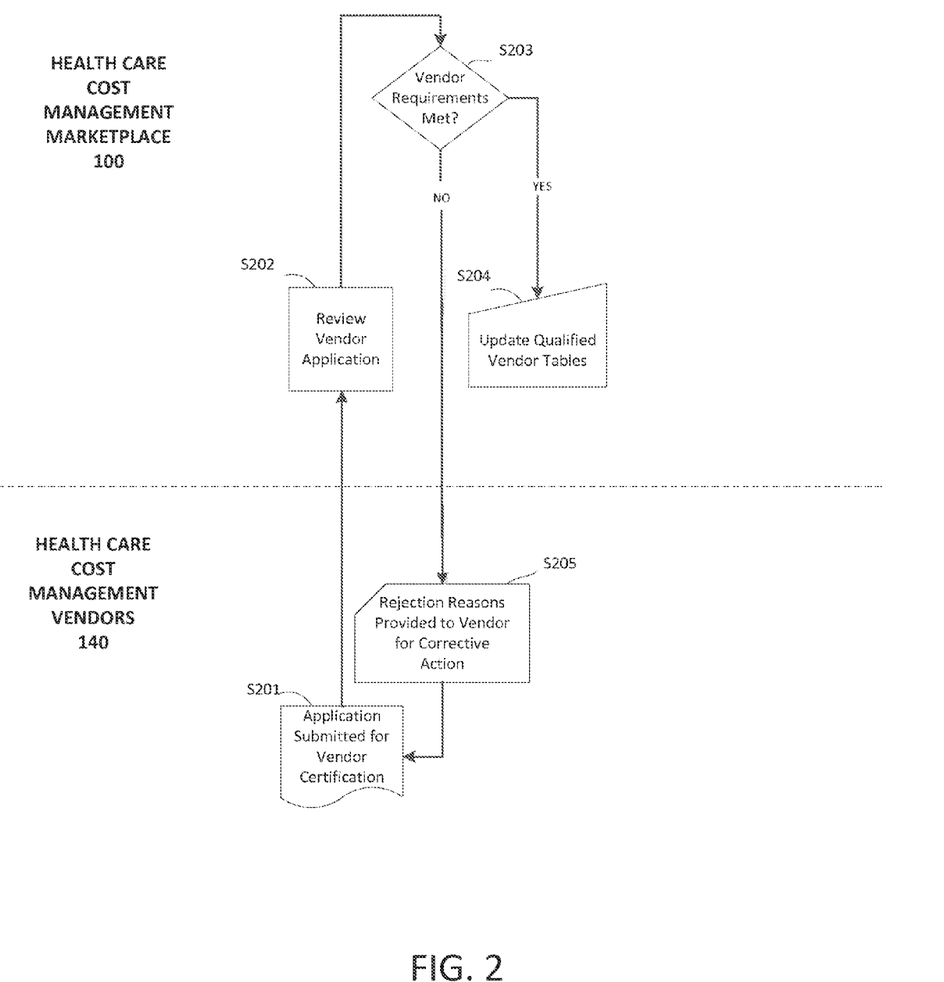
FIG. 2 shows an exemplary flow chart depicting a process for certifying a cost management vendor.
Figure 3:
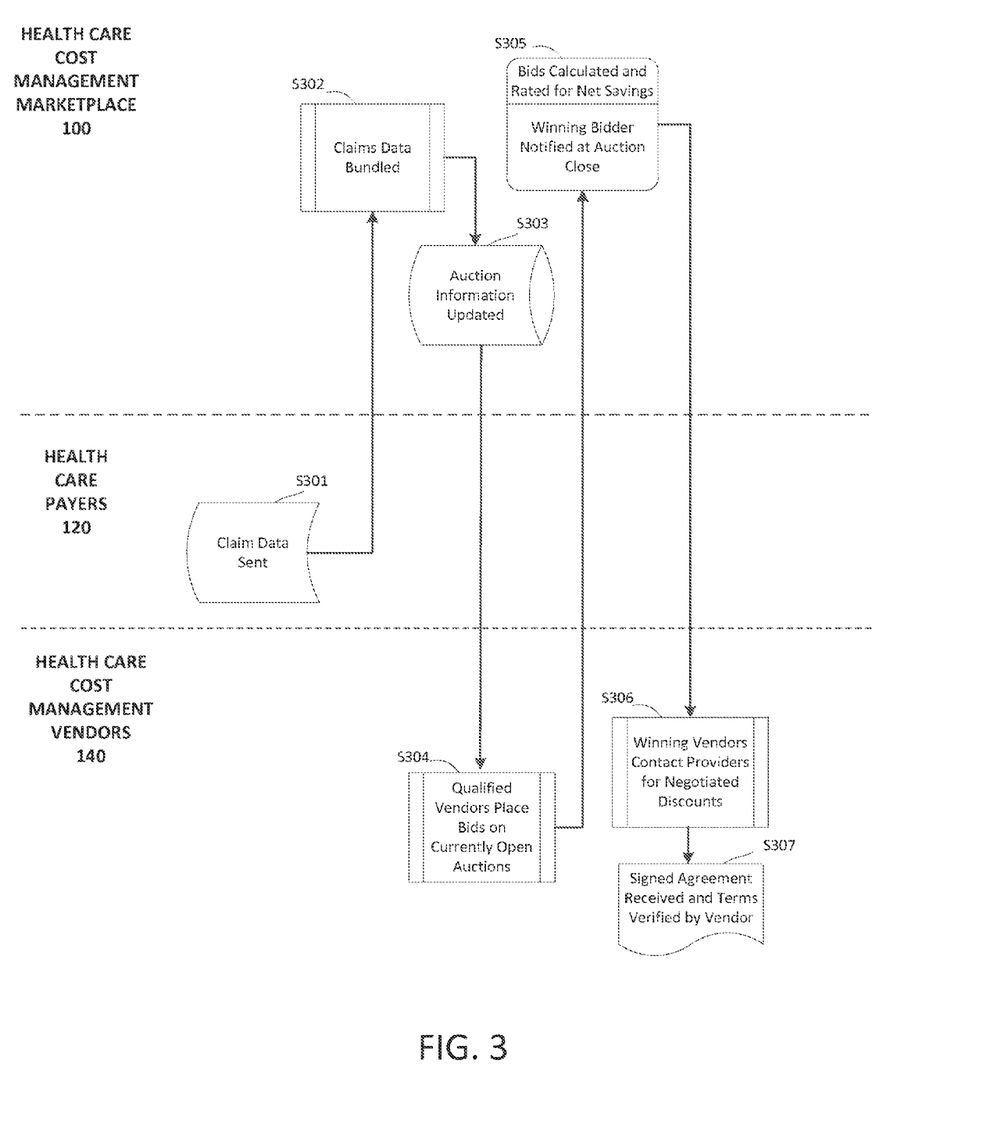
FIG. 3 shows an exemplary flow chart depicting a process for bidding on health care cost reduction services.
Figure 4:
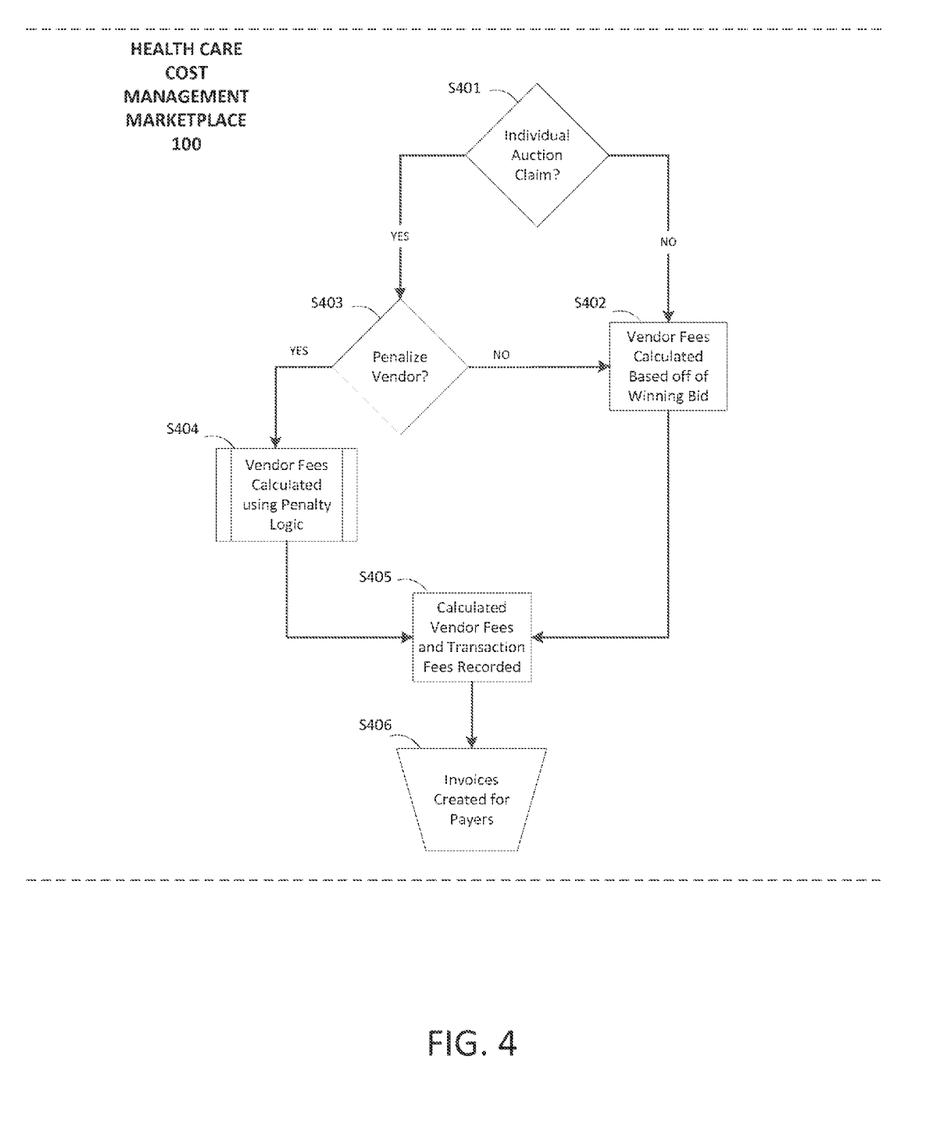
FIG. 4 shows an exemplary flow chart depicting a process for determining a fee for performing health care cost reduction services.

FIGS. 2-4 illustrate exemplary methods for performing various aspects of the present invention. It is to be understood that the steps illustrated herein can be performed by executing computer program code written in a variety of suitable programming languages, such as C, C++, C#, Visual Basic, and Java. It is also to be understood that the software of the invention will preferably further include various Web-based applications written in HTML, PHP, Javascript and accessible using a suitable browser (e.g., Internet Explorer, Mozilla Firefox, Google Chrome, Opera). FIGS. 5-8 are exemplary screen layouts for various screens useable in conjunction with the present invention. It is to be understood that the screen layouts presented herein are meant for illustrative purposes.

Process of Certifying a Cost Management Vendor

FIG. 2 illustrates an exemplary flow chart depicting a process for certifying a health care cost management vendor 140.

Preferably, each health care cost management vendor 140 will initially receive a certification packet including an application for participation in the health care cost management marketplace 100. In step S201, an application is submitted by a health care cost management vendor 140 to the health care cost management marketplace 100 for vendor certification. The application preferably will be available via a web site (e.g., as a HTML form) but could be provided in paper format, via a fillable PDF, taken over the telephone, etc. In step S202, the vendor application is reviewed, and in step S203, a determination is made as to whether vendor requirements are met. Examples of such vendor requirements include the ability of the vendor to electronically communicate with the health care cost management marketplace 100 and whether the vendor's experience in the field of health care cost management is extensive enough. Preferably, this step will also include a background check to ensure that the vendor operates ethically. If it is determined that the vendor requirements are met, in step S204, vendor tables are updated to include the vendor as being "certified" and therefore allowed to participate in the health care cost management marketplace 100. Otherwise, control passes to step S205 where rejection reasons are provided to the vendor for corrective action.

Process of Auctioning Claim Lots for Cost Reduction Services

FIG. 3 illustrates an exemplary flow chart depicting a process for bidding on health care cost reduction services.

Initially, in step S301, a health care payer 120 provides one or more claims for which health care cost reduction services are requested. Preferably, each claim will include claim-related information such as claim number, patient name, health care provider name, health care provider facility, billed amount, excluded amount, etc. Preferably, the claims will be sent electronically to the health care cost management marketplace 100, such as by using a Web site with an embedded file upload widget, via FTP transmission, or using electronic data interchange (EDI). Preferably, the claims will be sent in a structured format, most preferably in American National Standards Institute (ANSI) 837 format. All claims will be sent in a manner which ensures HIPPA compliance. Once claim information is received, it is stored into the database 104. Preferably, the database 104 includes various tables, such as (1) an auction lot table, each record in the table having a lot number and list of claims in the lot; (2) a bid history table, each record in the table having a history of bids and bid amounts for each of the lots; (3) a vendor table, each record in the table having information regarding the health care cost management vendor 140; and a health care payer table, each record in the table having health care payer information for a health care payer 120.

Next, in step S302, the claims are placed into single-claim lots or bundled into multiple claim lots, and the database 104 is updated (e.g., lots are added to the lot table). Predetermined rules are applied to determine how claims are to be placed into the lots. By way of example, any claim having a claim amount over a predetermined claim amount (e.g., $2,500) can be placed into a single lot. For those claims not meeting this criterion, the claims can be bundled into multiple-claim lots. For example, these claims might be bundled together with other claims for the same provider or patient. Other claim lots may simply be created by bundling claims to arrive at a claim lot having a total claim amount of at least a certain amount (e.g., $5,000), specific number of claim units, etc.

Next, in step S303, the lots are posted on a Web page accessible to the health care cost management vendors 140. Preferably, the auctions will not start immediately but will be assigned a start date well in advance of bidding.

In step S304, once bidding is started, each of the health care cost management vendors 140 may bid on the posted lots. Once bids are received, the database 104 is updated (e.g, the bid history table). The posted lots will include a lot number, and detail claim information will be available by drilling down. Preferably, auctions will occur several times per day, and each auction will be timed (e.g. 90 minutes). Preferably, the vendors will be able to change their bids at any time prior to the auction end. Preferably, the currently high bidder will be highlighted (e.g., using a color). Preferably, for single bid lots, the health care cost management vendors 140 will enter an estimated cost savings and a fee amount for the services. Preferably, the fee amount will be entered as a percentage of the actual cost savings. For the multiple claim lots, the health care cost management vendors 140 will enter only the fee amount (percentage). Preferably, only the fee amount (percentage) will be shown to the other bidders (the estimated cost savings will not be visible). Initial auction bidding will begin at the maximum rate Payers will allow for the cost management service.

In step S305, after the auction is closed, the winning bid will be determined. Preferably, the winning bid will be awarded to the bid having projected the greatest net savings to the health care payer 120 on single claim lots, and to the bidder with the lowest fee for service on multiple claim lots. Various database tables will preferably be updated to reflect the winning bid (e.g., the bidding history table, the vendor table).

By way of example, consider three health care cost management vendors 140, A, B, and C, which bid for a single $10,000 claim. As shown below, vendor A's final bid included a 20% estimated cost savings and a 20% fee; vendor's B's final bid included a 30% estimated cost savings and a 10% fee; and vendor C's final bid included a 25% estimated cost savings and a 5% fee.

| Vendor | Estimated Cost Savings (%) | Fee (%) | Net Savings |
|---|---|---|---|
| A | 20% discount ($2,000) | 20% ($400) | $1,600 |
| B | 30% discount ($3,000) | 10% ($300) | $2,700 |
| C | 25% discount ($2,500) | 5% ($125) | $2,375 |

The bid having the greatest estimated "net savings" will be considered the winning bid. Estimate net savings is calculated by subtracting the estimated vendor fee amount (i.e., the bid fee percentage) from the estimated cost savings. Since the estimated "net savings" for the final bid placed by Vendor B is the greatest (i.e., $2,700), the winning bid would be awarded to this vendor.

By the way of another example, consider three health care cost management vendors 140, X, Y, and Z, which bid for a multiple-claim lot.

| Vendor | Fee (%) |
|---|---|
| X | 8% |
| Y | 7% |
| Z | 5% |

In this case, the winning bid would be awarded to vendor Z since the fee percentage bid by vendor Z is the lowest.

In step S306, the winning health care cost management vendors 140 and respective health care payers 120 are notified, and all pertinent details of the claims are sent to the winning bidders for cost management processing. In step, S307, the winning health care cost management vendors 140 provide signed agreements from health care providers (or other evidence) indicating actual health care cost reductions achieved. Advantageously, the health care cost management marketplace 100 can standardize many contract terms, invoice the health care payers 120, and provide timely payments to the health care cost management vendors 140 for services rendered.

Process of Determining Health Care Cost Management Vendor Fees

FIG. 4 illustrates an exemplary flow chart depicting a process for determining a vendor fee for performing health care cost reduction services.

Initially, in step S401, a determination is made as to whether a particular lot is a single claim lot or a multiple claim lot. If it is determined that the lot is a multiple claim lot, the fee paid to the health care cost management vendor 140 will be calculated based on the winning bid. For example, if the winning bid was for 7% cost reduction and the total claim savings paid was $2,000, then the fee would be $140 (i.e., 7% of $2,000). However, if it is determined that the lot is a single claim lot, then a comparison is made between the actual savings amount negotiated or provided by the vendor and the estimated savings amount provided in the bid. If the actual savings amount is less than the estimated claim amount by more than a predetermined amount or percentage, then the vendor will be penalized. By way of example, consider a vendor whose bid was to reduce billed charges by 30% (i.e., the $10,000 claim to be reduced by $3,000) for a 10% of savings fee, but only achieved a 15% reduction (i.e., the $10,000 claim was reduced by $1,500). Assuming the penalty applies whenever the vendor fails to achieve 85% of the estimate, this vendor would be penalized. In this case, since the vendor missed the actual cost reduction by 50% the vendor's fee might be reduced by 50% (i.e., 50% of 10%=5%), so the vendor will get $75 instead of $150), for example.

Figure 5:
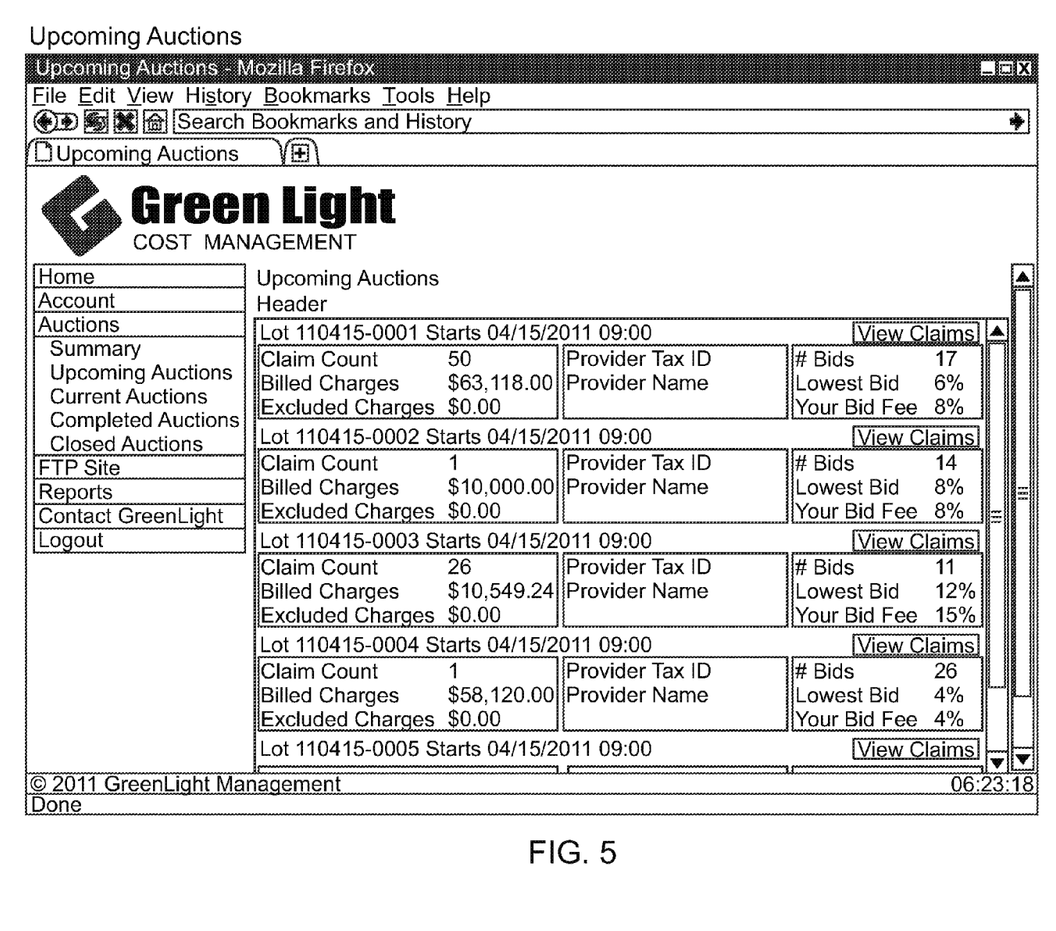
FIG. 5 shows an exemplary screen layout for displaying upcoming health care cost reduction auctions.
Figure 6:
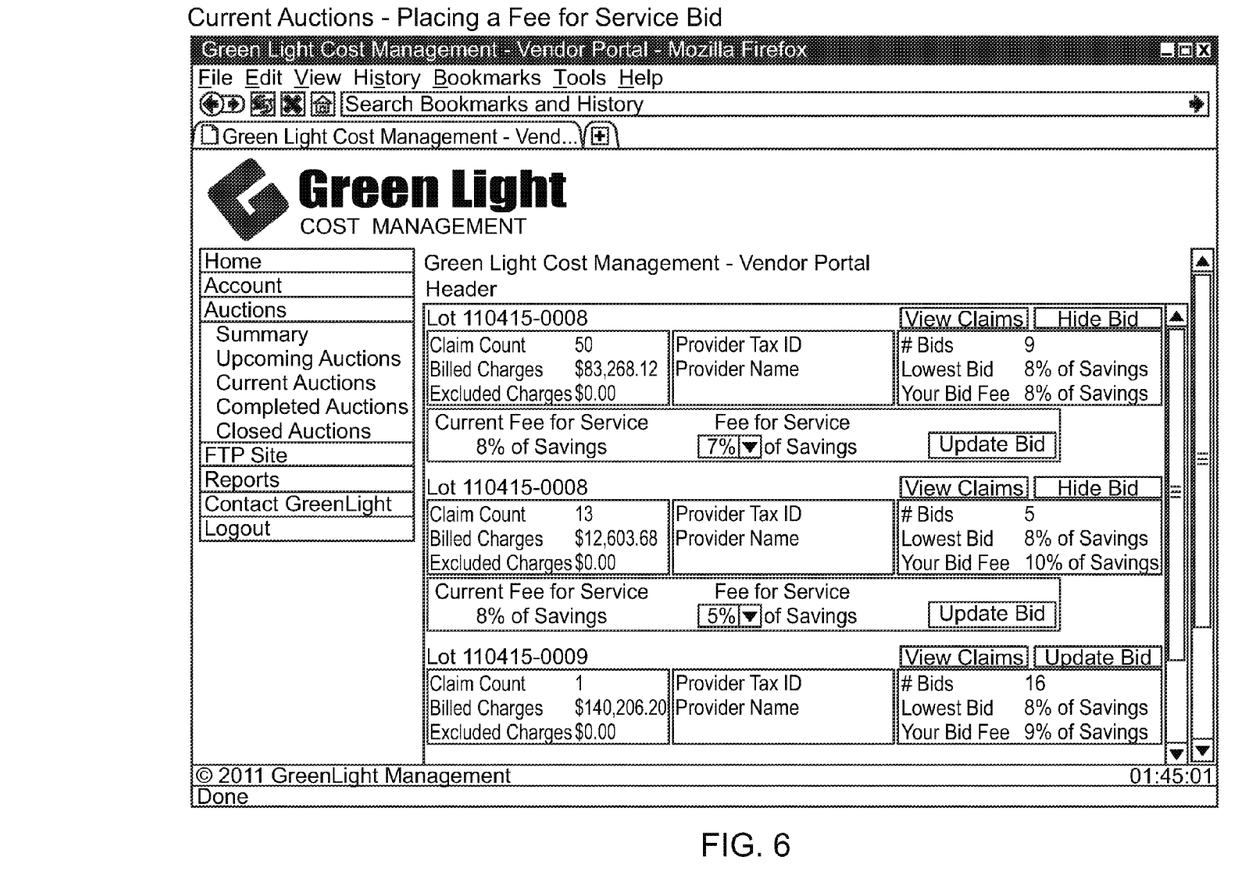
FIG. 6 shows an exemplary screen layout for displaying current health care cost reduction auctions and entering or changing a bid.
Figure 7:
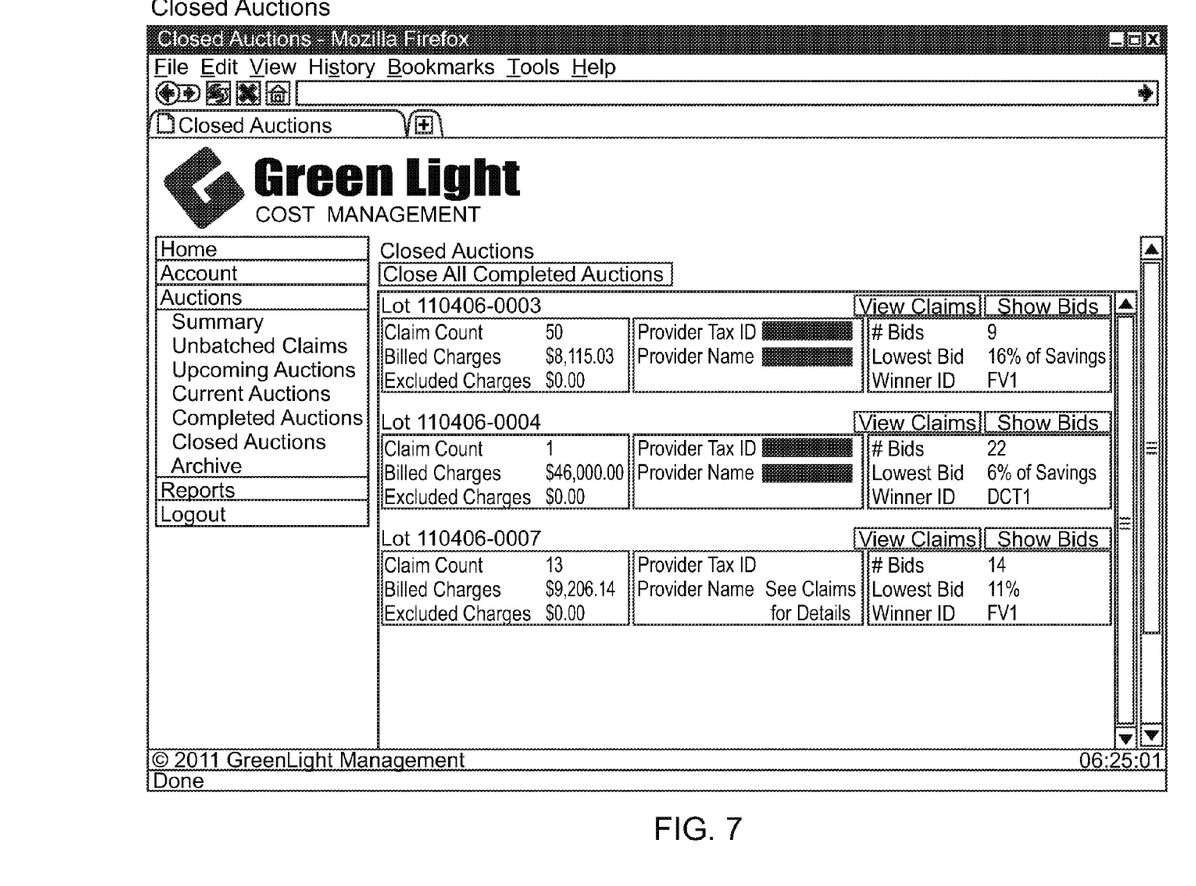
FIG. 7 shows an exemplary screen layout for displaying closed health care cost reduction auctions.
Figure 8:
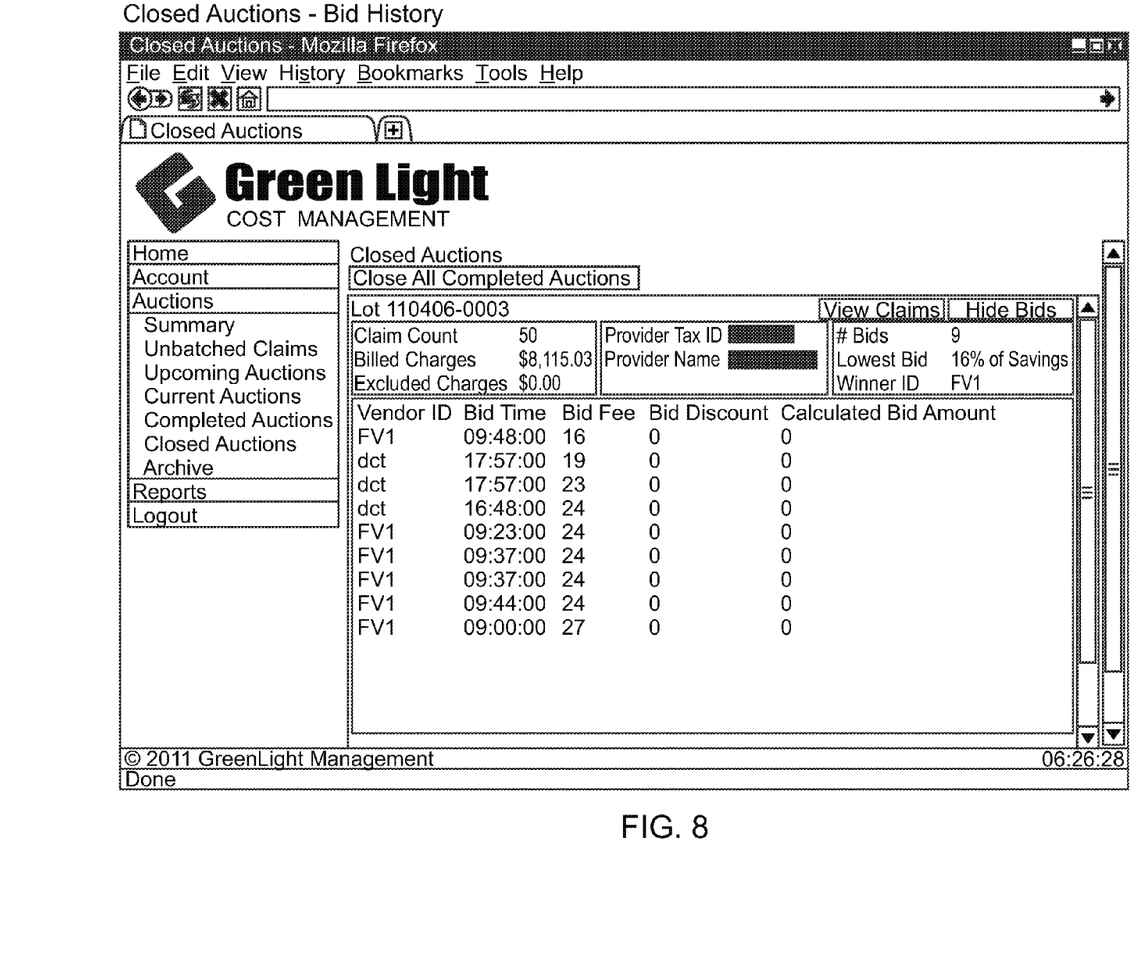
FIG. 8 shows an exemplary screen layout for displaying a bid history for a health care cost reduction auction.

FIGS. 5 to 7 show various exemplary screen layouts for use in conjunction with the present invention. FIG. 5 shows an exemplary screen layout for displaying upcoming health care cost reduction auctions. This screen shows all auctions that will be open and allows for vendors to drill down obtaining detailed claim information so as to allow for informed bidding. FIG. 6 shows an exemplary screen layout for displaying current health care cost reduction auctions and entering or changing a bid. As shown, a vendor can enter a fee percentage using a pull down menu. The vendors can see also the currently highest bid percentage which allows for a competitive bidding process. Preferably, the most current highest bid percentage is highlighted (e.g., using a color). FIG. 7 shows an exemplary screen layout for displaying closed health care cost reduction auctions. FIG. 8 shows an exemplary screen layout for displaying a bid history for a health care cost reduction auction.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A computer-implemented system, including a cost management marketplace computer system configured to:
   receive requests to perform health care cost reduction services, each of the requests referring to at least one claim for at least one health care service previously rendered;
   create claim lots, wherein, depending on application of predetermined rules, some of the received claims are placed into single-claim lots or bundled together into multiple-claim lots;
   post the created claim lots in a visible format; and
   responsive to the posting, receiving bids for performing health care cost reduction services for at least one of the posted claim lots, from cost reduction management vendors;
   wherein the cost management marketplace computer system is further configured to award a cost reduction contract to perform health care cost reduction services to a cost reduction management vendor whose bid projects the greatest net health care cost reduction savings.

2. The computer-implemented system of claim 1, wherein only bids received for a particular claim lot within a predetermined time period are considered for the contract.

3. The computer-implemented system of claim 2, wherein bids received for a particular claim lot may be changed if received within the predetermined time period.

4. The computer-implemented system of claim 1, wherein each of the requests to perform health care cost reduction services is received from a health care payer.

5. The computer-implemented system of claim 1, wherein each of the bids for performing health care cost reduction services is received from a certified cost reduction management vendor.

6. The computer-implemented system of claim 1, wherein the requests to perform health care cost reduction services include electronic transfer of claims information in ANSI 837 format.

7. The computer-implemented system of claim 1, wherein the predetermined rules for creating claim lots includes creating a single-claim lot if the claim amount exceeds a predetermined threshold amount.

8. The computer-implemented system of claim 1, wherein at least one bid for performing health care cost reduction services includes an amount of projected savings and a fee for the cost reduction services.

9. The computer-implemented system of claim 8, wherein the fee is a percentage of the actual claim amount reduction.

10. The computer-implemented system of claim 1, further including penalizing the awarded health care cost reduction management vendor, if the actual claim amount reduction is less than the projected claim amount reduction by more than a predetermined amount or predetermined percentage.

11. The computer-implemented system of claim 10, wherein the penalty amount is proportionate to the percentage that actual claim reduction amount is different from the projected claim reduction amount.

12. A computer-implemented system, including a cost management marketplace computer system configured to:
receive requests to perform health care cost reduction services, each of the requests referring to at least one claim for at least one health care service previously rendered;
create claim lots, wherein, depending on application of predetermined rules, some of the received claims are placed into single-claim lots or bundled together into multiple-claim lots;
post the created claim lots in a visible format; and responsive to the posting, receiving bids for performing health care cost reduction services for at least one of the posted claim lots, from cost reduction management vendors;
wherein at least one of the bids for performing health care cost reduction services includes a lowest fee for services;
wherein the cost management marketplace computer system is further configured to award a cost reduction contract to perform health care cost reduction services to a cost reduction management vendor whose bid included the lowest fee for services.

13. A computer-implemented system, including a cost management marketplace computer system configured to:
receive requests to perform health care cost reduction services, each of the requests referring to at least one claim for at least one health care service previously rendered;
create claim lots, wherein, depending on application of predetermined rules, some of the received claims are placed into single-claim lots or bundled together into multiple-claim lots;
post the created claim lots in a visible format; and responsive to the posting;
receiving bids for performing health care cost reduction services for at least one of the posted claim lots, from cost reduction management vendors;
wherein the predetermined rules for creating claim lots includes creating a multiple-claim lot by bundling claims for a same health care provider;
wherein at least one of the bids for performing health care cost reduction services includes a lowest fee for services;
wherein the cost management marketplace computer system is further configured to award a cost reduction contract to perform health care cost reduction services to a cost reduction management vendor whose bid projects the greatest net health care cost reduction savings or award a cost reduction contract to perform health care cost reduction services to the cost reduction management vendor whose bid included the lowest fee for services.

14. A computer-implemented system, including a cost management marketplace computer system configured to:
receive requests to perform health care cost reduction services, each of the requests referring to at least one claim for at least one health care service previously rendered;
create claim lots, wherein, depending on application of predetermined rules, some of the received claims are placed into single-claim lots or bundled together into multiple-claim lots;
post the created claim lots in a visible format; and
responsive to the posting, receiving bids for performing health care cost reduction services for at least one of the posted claim lots, from cost reduction management vendors;
wherein the predetermined rule for creating claim lots includes creating a multiple-claim lot by bundling claims for a same patient;
wherein at least one of the bids for performing health care cost reduction services includes a lowest fee for services;
wherein the cost management marketplace computer system is further configured to award a cost reduction contract to perform health care cost reduction services to a cost reduction management vendor whose bid projects the greatest net health care cost reduction savings or award a cost reduction contract to perform health care cost reduction services to the cost reduction management vendor whose bid included the lowest fee for services.

15. A computer-implemented system, including a cost management marketplace computer system configured to:
receive requests to perform health care cost reduction services, each of the requests referring to at least one claim for at least one health care service previously rendered;
create claim lots, wherein, depending on application of predetermined rules, some of the received claims are placed into single-claim lots or bundled together into multiple-claim lots;
post the created claim lots in a visible format; and responsive to the posting, receiving bids for performing health care cost reduction services for at least one of the posted claim lots, from cost reduction management vendors;
wherein the predetermined rules for creating claim lots includes creating a multiple-claim lot by bundling claims each of which claim is less than a predetermined threshold amount;

wherein at least one of the bids for performing health care cost reduction services includes a lowest fee for services;

wherein the cost management marketplace computer system is further configured to award a cost reduction contract to perform health care cost reduction services to a cost reduction management vendor whose bid projects the greatest net health care cost reduction savings or award a cost reduction contract to perform health care cost reduction services to the cost reduction management vendor whose bid included the lowest fee for services.

16. A computer-implemented system, including a cost management marketplace computer system configured to:

receive requests to perform health care cost reduction services, each of the requests referring to at least one claim for at least one health care service previously rendered;

create claim lots, wherein, depending on application of predetermined rules, some of the received claims are placed into single-claim lots or bundled together into multiple-claim lots;

post the created claim lots in a visible format; and responsive to the posting, receiving bids for performing health care cost reduction services for at least one of the posted claim lots, from cost reduction management vendors;

wherein at least one of the bids for performing health care cost reduction services includes a lowest fee for services;

wherein the cost management marketplace computer system is further configured to award a cost reduction contract to perform health care cost reduction services to a cost reduction management vendor whose bid projects the greatest net health care cost reduction savings or award a cost reduction contract to perform health care cost reduction services to the cost reduction management vendor whose bid included the lowest fee for services.

* * * * *